US006674973B2

(12) United States Patent
Leclerc et al.

(10) Patent No.: US 6,674,973 B2
(45) Date of Patent: *Jan. 6, 2004

(54) DOUBLE FILTERING FIBER OPTIC SOLITON SIGNAL TRANSMISSION SYSTEM

(75) Inventors: Olivier Leclerc, St. Michel sur Orge (FR); Emmanuel Desurvire, Bruyeres-le-Chatel (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,639

(22) Filed: May 18, 1999

(65) Prior Publication Data

US 2002/0141012 A1 Oct. 3, 2002

(30) Foreign Application Priority Data

May 28, 1998 (FR) .............................. 98 06764

(51) Int. Cl.[7] .............................................. H04B 10/02
(52) U.S. Cl. ..................... 398/175; 398/146; 398/149; 398/155; 398/179
(58) Field of Search ................. 359/124, 158, 359/326, 161, 173, 176

(56) References Cited

U.S. PATENT DOCUMENTS

| | | | | |
|---|---|---|---|---|
| 5,401,957 A | * | 3/1995 | Suzuki et al. | 250/227.21 |
| 5,642,215 A | * | 6/1997 | Suzuki et al. | 359/161 |
| 5,726,789 A | * | 3/1998 | Horiuchi et al. | 359/184 |
| 5,757,529 A | * | 5/1998 | Desurvire et al. | |
| 5,801,862 A | * | 9/1998 | Desurvire et al. | |
| 5,828,478 A | * | 10/1998 | Thomine et al. | 359/181 |
| 5,857,040 A | * | 1/1999 | Bigo et al. | |
| 6,078,416 A | * | 6/2000 | Yano | 359/158 |
| 6,201,621 B1 | * | 3/2001 | Desurvire et al. | |

FOREIGN PATENT DOCUMENTS

EP 0 718 992 A1 6/1996

OTHER PUBLICATIONS

Suzuki, K. et al, "40GBIT/S Single Channel Optical Soliton Transmission Over 70000 KM Using In–Line Synchronous Modulation and Optical Filtering", Electronic Letters, vol. 34, No. 1, Jan. 8, 1998, pp. 98–100, XP000773631.
Nakazawa M. et al.: "40GBIT/S WDM (10GBIT/S 1–14 X 4 Unequally Spaced Channels) Coliton Transmission Over 10000 KM Using Synchronous Modulation and Narrow Band Optical Filtering", Electronics Letters, vol. 32, No. 9, Apr. 25, 1996, pp. 828–830, XP000595674.

* cited by examiner

Primary Examiner—Jason Chan
Assistant Examiner—Dzung Tran
(74) Attorney, Agent, or Firm—Sughrue Mion, PLLC

(57) ABSTRACT

The invention concerns a fiber optic soliton signal transmission system comprising a signal amplifier means and signal regenerator means, in-line first filter means and second filter means associated with the regenerator means, the second filter means being different from the first filter means.

Independent optimization of the in-line filter means and the filter means associated with the regenerator improves the performance of the transmission system.

In the case of wavelength division multiplexed systems, the invention reduces the effects of jitter induced by collisions between solitons.

19 Claims, 2 Drawing Sheets

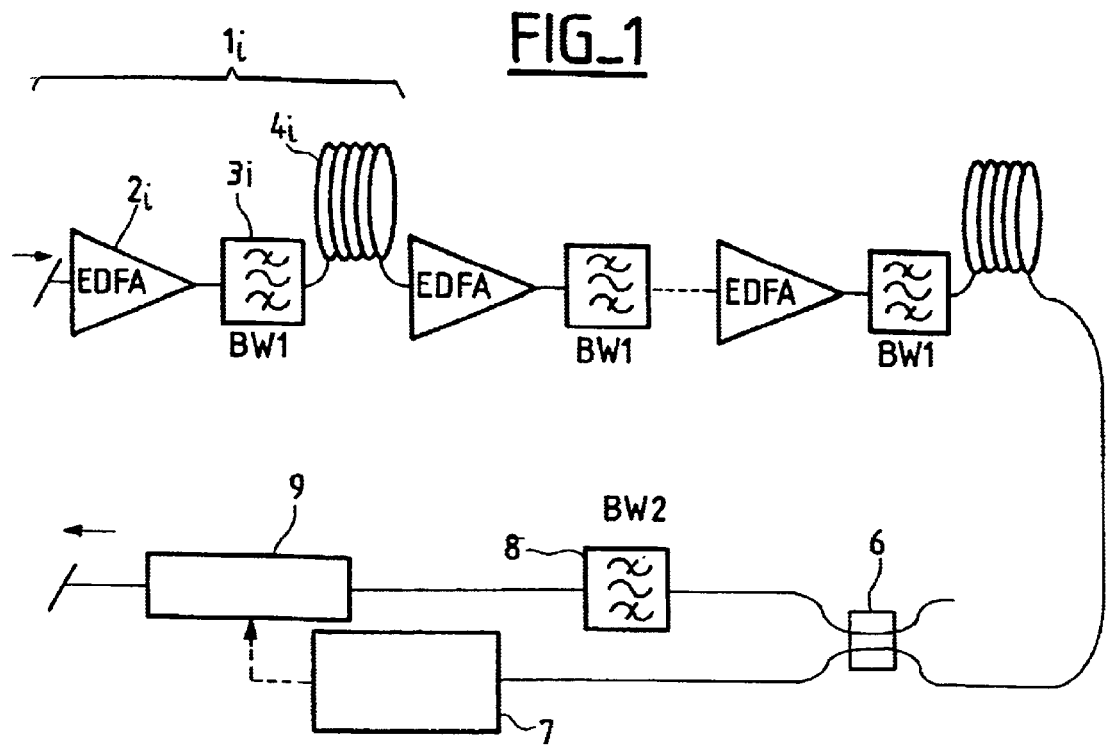
FIG_1
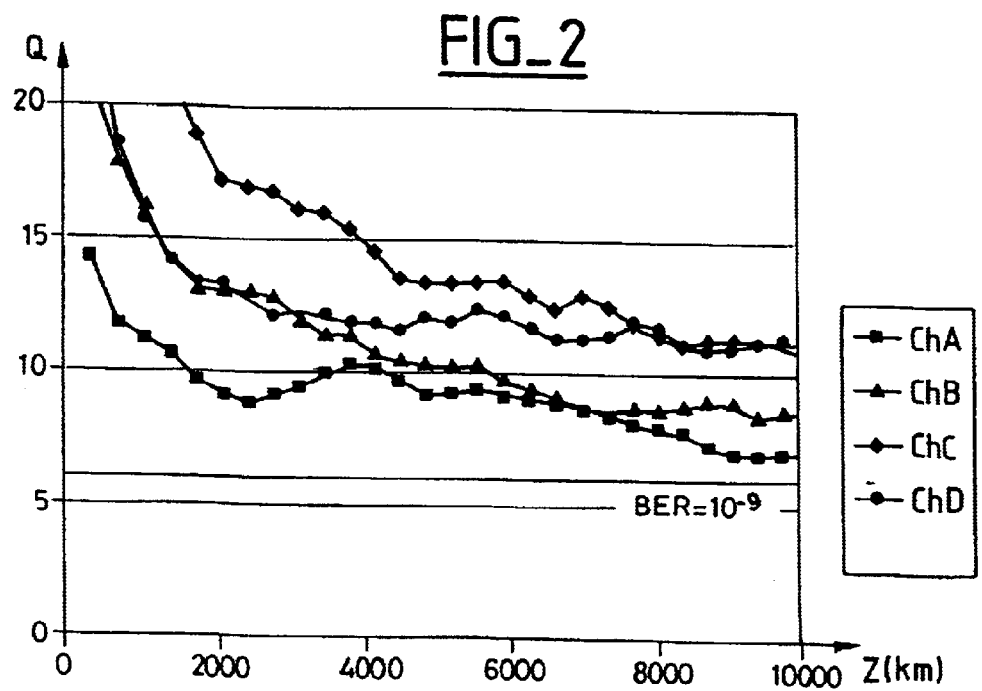
FIG_2

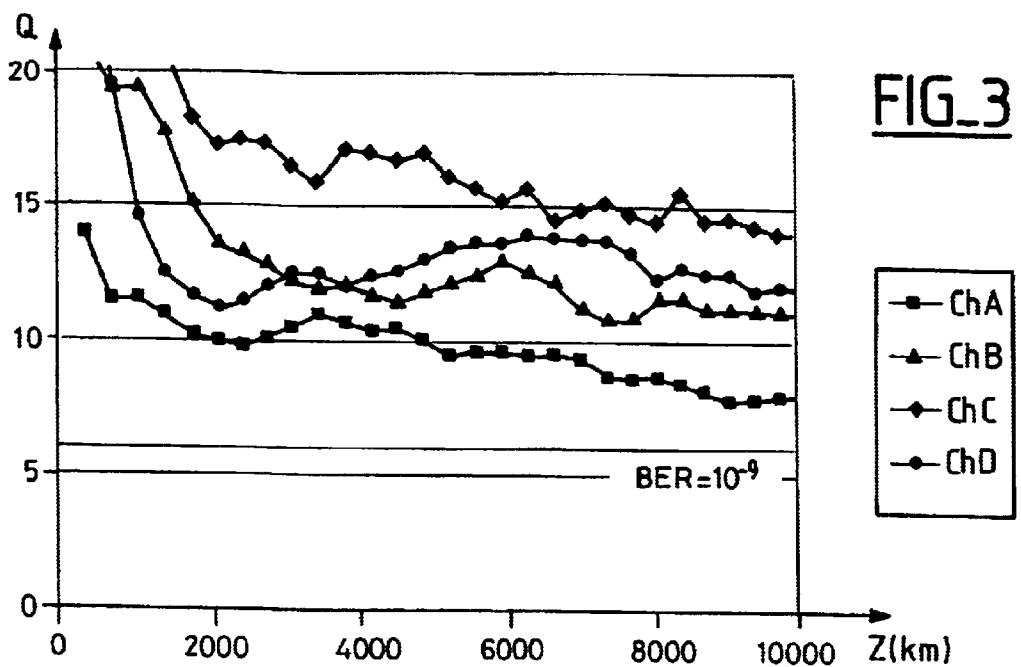
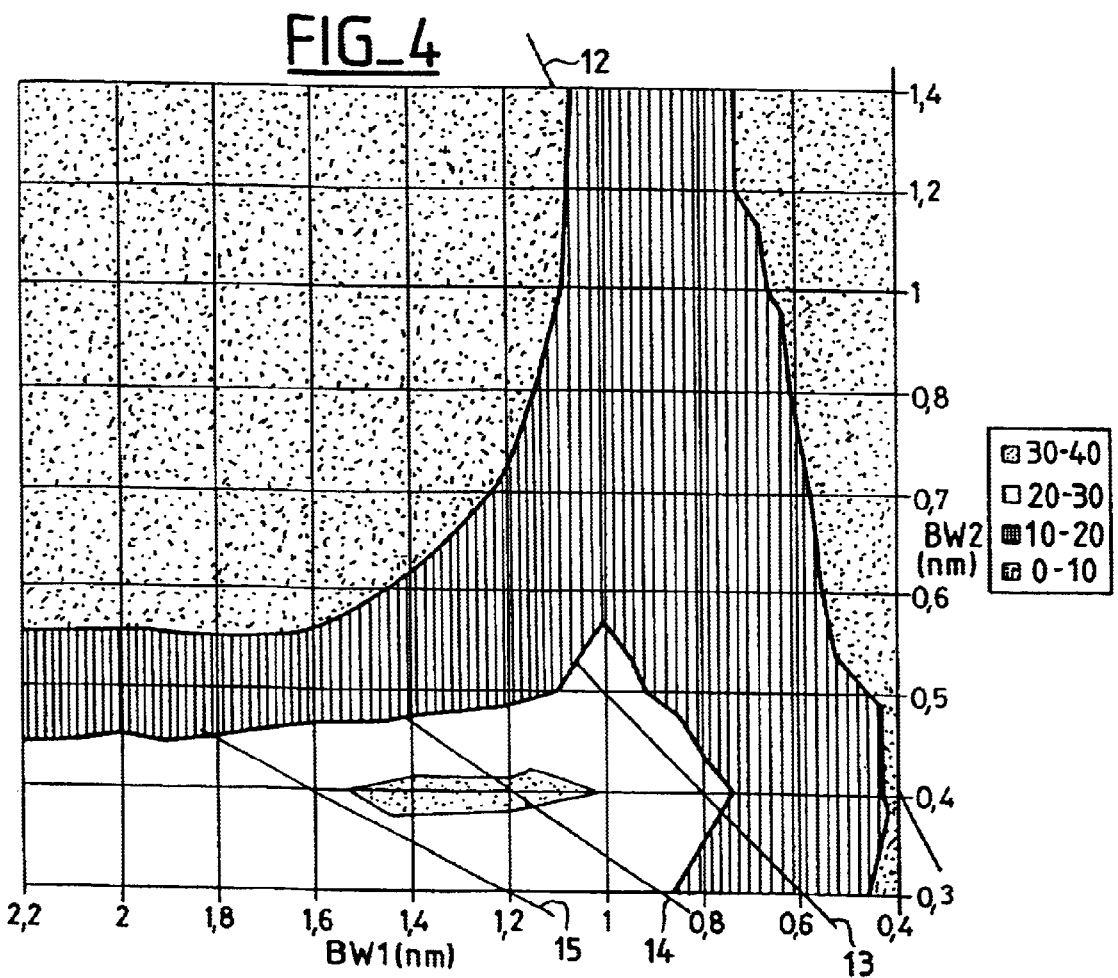

DOUBLE FILTERING FIBER OPTIC SOLITON SIGNAL TRANSMISSION SYSTEM

The present invention concerns a fiber optic soliton signal transmission system and a method of transmission in such a system that reduces the effect of collision jitter.

BACKGROUND OF THE INVENTION

Transmitting soliton pulses or solitons in the part of an optical fiber that has abnormal dispersion is known per se. Solitons are pulse signals of $sech^2$ form. With this form of pulse, non-linearity in the corresponding part of the fiber compensates dispersion of the optical signal. The non-linear Schrödinger equation models the transmission of solitons.

Various effects limit the transmission of such pulses, such as jitter induced by the solitons interacting with noise present in the transmission system, as described for example in an article by J. P. Gordon and H. A. Haus, Optical Letters, vol. 11, no. 10, pages 665–667. This effect, known as the Gordon-Haus effect or Gordon-Haus jitter, imposes a theoretical limit on the quality or bit rate of soliton transmission.

To exceed this limit it is possible to use synchronous modulation of soliton signals by means of semiconductor modulators. Sliding guide filter systems have also been proposed for controlling the jitter of transmitted solitons (see for example EP-A-0 576 208). Using the Kerr effect in synchronous amplitude or phase modulators to regenerate the signal in the line and the use of saturable absorbers have also been proposed. Synchronous modulation of the soliton signals by a clock signal or clock to correct their jitter is described, for example, in an article relating to intensity modulation by H. Kubota and M. Nakasawa, IEEE Journal of Quantum Electronics, vol. 29, no. 7 (1993), p. 2189 et seq. and in an article relating to phase modulation by N. J. Smith and N. J. Doran, Optical Fiber Technology, 1, p. 218 (1995). The Kubota article proposes using an associated filter or regenerator to control amplitude fluctuations generated by the modulation.

Using wavelength division multiplexing (WDM) to increase the bit rate of fiber optic systems for transmitting soliton signals has also been proposed. In this case it is considered advantageous to use Fabry Perot sliding guide filters, which are entirely compatible with wavelength division multiplexed signals. In contrast, using synchronous modulators or saturable absorbers to regenerate wavelength division multiplexed soliton signals is affected by problems concerning the group velocity differences between the signals on different channels.

An article by E. Desurvire, O. Leclerc and O. Audouin, Optics Letters, vol. 21, no. 14, pages 1026–1028, describes a scheme for allocating wavelengths that is compatible with the use of synchronous modulators. The article proposes allocating wavelengths to channels of the multiplex so that, for given intervals $Z_R$ between repeaters, the signals on the various channels, or to be more precise the bit times of the various channels of the multiplex, are substantially synchronized when they reach the repeaters. This makes in-line synchronous modulation of all the channels possible, at given intervals, using discrete synchronous modulators. This technique for allocating the wavelengths of the multiplex is also described in French Patent Application 96 00732 of Jan. 23, 1996 in the name of Alcatel Submarine Networks, which proposes choosing a sub-group of channels that are synchronous not only with the intervals $Z_R$ but also with intervals that are sub-multiples of $Z_R$. Other aspects of this wavelength allocation technique are described in articles by E. Desurvire, O. Leclerc and O. Audouin, "Synchronous WDM Soliton Regeneration: Toward 80–160 Gbit/s Transoceanic Systems", Optical Fiber Technology, 3 pages 97–116 (1997) and by E. Desurvire et al., "Transoceanic Regenerated Soliton Systems: Designs for over 100 Gbit/s Capacities", Suboptic '97, pages 438–447. Patent application FR-A-2 743 964, "French title" [A method and apparatus for on-line regeneration of a signal transmitted by wavelength division multiplexed solitons using synchronous modulation, and an optical telecommunications system using the method] is also relevant.

An article by L. F. Mollenauer, S. G. Evangelides and P. J. Gordon, "Wavelength Division Multiplexing with Solitons in Ultra long Distance Transmissions using Lumped Amplifiers", Journal of Lightwave Technology, vol. 9, no. 3, pages 362–367 (1991) describes the problem of collisions between solitons in wavelength division multiplexed transmission systems and in particular highlights propagation speed variations induced by collisions. Such variations can induce unacceptable jitter of the solitons at the output of the transmission system. The article explains that variations in the chromatic dispersion of the fiber along the transmission path can compensate the effects of collisions. It therefore proposes using segments with different dispersion characteristics to compensate the effects of collisions on the propagation speed of solitons in a transmission system in which the distance between amplifiers is small compared to the length of collisions.

The above solution is difficult to apply on an industrial scale because of fiber management constraints and the small spacing between amplifiers. Moreover, it does not apply to wavelength division multiplexed transmission systems using wavelength allocation schemes of the type referred to above, because variations in the dispersion of the fiber would disrupt the synchronicity of the bit times at the synchronous regenerators.

An article by A. Hasegawa, S. Kumar and Y. Kodoma, "Reduction of Collision-induced time-jitter in Dispersion-managed Soliton Transmission Systems", Optics Letters, vol. 21, no. 1, January 1996, pages 39–41, proposes a scheme for managing dispersion in the fiber which enables the distance between amplifiers to be increased. That solution is based on a stepped dispersion profile of the fiber approximating as closely as possible an ideal exponential profile. That solution cannot be implemented industrially and causes problems with the frequency allocation scheme referred to above.

OBJECTS AND SUMMARY OF THE INVENTION

The aim of the invention is to solve the problem of optimizing filtering in a soliton signal transmission system using synchronous regeneration. In a single-channel system, as in a wavelength division multiplex transmission system, the invention regulates the increase in noise and reduces amplitude fluctuations induced by synchronous modulation. Another aim of the invention is to solve the problem of managing collisions between solitons in a signal transmission system. The invention avoids the need to vary the dispersion profile of the transmission fiber along the transmission system. It applies with particular advantage to wavelength division multiplexed transmission systems in which the wavelengths are chosen to assure synchronicity of the bit times of the channels at given intervals. The invention proposes a simple solution which limits time-jitter due to collisions between solitons. The invention also applies to single-channel soliton signal transmission systems. In these systems it improves transmission performance.

To be more precise, the invention proposes a fiber optic soliton signal transmission system comprising signal amplifier means and signal regenerator means, inline first filter means and second filter means associated with the regenerator means, the second filter means being different from the first filter means.

In one embodiment the first filter means have a greater bandwidth than the second filter means.

The first filter means are preferably on the output side of the amplifier means.

In another embodiment the second filter means are on the input side of the regenerator means.

The regenerator means advantageously comprise an intensity modulator.

In one embodiment the system is a single-channel system and the second filter means have a bandwidth in the range from one-quarter to one-half that of the first filter means, preferably in the order of one-third that of the first filter means.

In another embodiment the system is a wavelength division multiplexed system and the second filter means have a bandwidth more than two-thirds that of the first filter means.

The invention also proposes a method of transmitting soliton signals including a step of amplifying the signals, a step of regenerating the signals, an in-line filtering step and a regeneration filter step effected by second filter means different from the first filter means used for the in-line filtering step.

The first filter means advantageously have a greater bandwidth than the second filter means.

An in-line filtering step can be effected immediately after an amplification step.

A regeneration filtering step is preferably effected immediately before a regeneration step.

The regeneration step advantageously involves intensity modulation.

In one embodiment the transmission system is a single-channel transmission system and the second filter means have a bandwidth in the range from one-quarter to one-half that of the first filter means, preferably in the order of one-third that of the first filter means.

In another embodiment the transmission system is a wavelength division multiplexed transmission system and the second filter means have a bandwidth greater than two-thirds that of the first filter means.

BRIEF DESCRIPTION OF THE DRAWINGS

Other features and advantages of the invention will become apparent on reading the following description of embodiments of the invention given by way of example and with reference to the accompanying drawings, in which:

FIG. 1 is a diagrammatic representation of a section of a wavelength division multiplex soliton signal transmission system in accordance with the invention;

FIG. 2 is a graph of Q factor as a function of distance in a transmission system having only one type of filter;

FIG. 3 is a graph of Q factor as a function of distance in a transmission system in accordance with the invention;

FIG. 4 is a graph of Q factor as a function of the bandwidths of the two types of filter in a single-channel system.

MORE DETAILED DESCRIPTION

The invention applies in particular to a wavelength division multiplexed fiber optic soliton signal transmission system. It is described hereinafter with reference to a system in which the wavelengths of the multiplex are chosen to assure a relative slip between the channels substantially equal to a multiple of the bit time in a given interval. However, it is not limited to a transmission system using this kind of frequency allocation scheme, and applies more generally to any wavelength division multiplexed soliton signal transmission system.

The example described can use the wavelength allocation solutions described in the articles by E. Desurvire and O. Leclerc referred to above, which are particularly pertinent with reference to the wavelength allocation schemes. One such wavelength allocation scheme assures, at regular intervals $Z_R$ along the fiber, a relative slip between channels that is substantially equal to a multiple of the bit time.

The problem in a wavelength division multiplexed transmission system, and in particular in a system with a wavelength allocation scheme of the above kind, is that collisions between soliton signals in the amplifier, or more generally in any asymmetrical device of the system, induce variation in the frequency of the solitons. This variation is manifested as time-jitter at the receiving end. The sign of the frequency variations depends on the relative spectrum position of the soliton signals involved in the collision. For example, considering two streams of solitons at wavelengths $\lambda_1$ and $\lambda_2$, with $\lambda_1 < \lambda_2$, collisions between the soliton signals of the faster stream at $\lambda_1$ and the signals of the stream at $\lambda_2$ increase the wavelength of the stream of solitons at $\lambda_2$ by an amount $\Delta\lambda$ and reduce the wavelength of the stream at $\lambda_1$ by the same amount. The wavelength variation $\Delta\lambda$ is explained in the article by Mollenauer et al previously referred to.

The wavelength variation speeds up the faster solitons, i.e. those at the shorter wavelength, and slows down the slower solitons, i.e. those at the longer wavelength. This effect is explained as follows: the soliton propagation speed decreases with wavelength and the solitons on the various channels of the multiplex approach and pass through each other. Non-linearities in the fiber—Kerr effect, four-wave mixing—cause them to interfere with each other. In the first half of the collision the solitons at different wavelengths begin by attracting each other. Their speed changes—the faster soliton is slowed down and the slower soliton is speeded up—in proportion to the non-linearities of the fiber, also related to the intensity of the signal. In the second part of the collision the effects are reversed. If the non-linearity in the fiber is constant throughout the interaction, the speed difference cancels out at the end of the collision and the two solitons suffer the same delay. In a real system, because of losses in the fiber and intensity variations induced by the amplifiers, the non-linearity is not constant during the collision and the collisions therefore cause a residual variation in speed or frequency of the solitons.

To reduce the jitter due to the collision, the invention proposes separating the filters for optimizing regeneration and in-line control of the solitons. It therefore proposes providing the transmission system with filters of a first type dedicated to optimizing regeneration and filters of a second type dedicated to optimizing in-line control of the solitons.

FIG. 1 is a diagrammatic representation of a section of a wavelength division multiplexed soliton signal transmission system in accordance with the invention; the transmission system typically comprises a transmitter and a receiver connected by a plurality of sections of the type shown in FIG. 1. The section of the transmission system shown in FIG. 1 itself comprises a plurality of portions $1_i$, where i is an integer, and a regenerator. Each portion comprises an amplifier $2_i$ driving a filter $3_i$ of a first type. The output of the filter $3_i$ is connected to one end of a line fiber $4_i$ whose other end is the end of the portion $1_i$. Each portion is typically a line fiber with a length in the range from 30 km to 100 km, for example 45 km, and the amplifiers are erbium doped fiber amplifiers using approximately 20 m of fiber strongly doped with erbium. A section can have a total length in order of 900 km, for example, which represents from 9 to 30 line fiber portions. In a wavelength division multiplexed transmission system, the number of portions and their unit length are chosen so that the regenerators are spaced by an interval $Z_R$ assuring synchronous bit times.

The filters $3_i$ at the output of the amplifiers are optimized to eliminate some of the asynchronous spontaneous emission noise outside the transmission channel(s). In wavelength division multiplexed transmission, the filters $3_i$ are Fabry Perot filters, for example, or filters associated with a multiplexer/demultiplexer. For a single-channel system the filters can be Butterworth filters or Bragg filters, for example.

The filters are optimized in a manner that is known per se and minimizes the effects of asynchronous spontaneous emission noise outside the transmission channel.

The section shown in FIG. 1 also includes a regenerator, which here is a synchronous modulator. As explained above, it can be an intensity or phase modulator. The position of the modulator, i.e. the length of the section of the transmission system shown in FIG. 1, is advantageously chosen to assure synchronous or quasi-synchronous bit times of the channels of the multiplex on reaching the modulator. The modulator includes a coupler 6, for example a 10/90 coupler, which samples part of the transmitted signal to regenerate a modulation clock. The clock regenerator device 7 receives the part of the signal diverted by the coupler 6 and supplies a clock signal to the modulator 9. Downstream of the coupler is a filter 8 of a second type, followed by a synchronous modulator. The modulator 9 receives the clock signal supplied by the clock regenerator device and modulates the soliton signals. The output of the modulator 9 is connected to a line fiber section 10.

The filter 8 upstream of the modulator is a filter of the second type, which is optimized for regeneration, and so applies selective losses to the soliton signals. The solitons are therefore widened, and this widening makes the intensity modulation more effective. In the case of phase modulation, the filter controls the spectral width of the pulses.

FIG. 2 is a graph of Q factor as a function of distance in a transmission system using only one type of filter. In this case, the filters are optimized both to reduce noise on the line and to improve optimization. For the FIG. 2 simulation a transmission system with the following characteristics was used:

distance between amplifiers: $Z_A$=50 km;
  amplifier gain: 10 dB;
  distance between modulators: $Z_R$=350 km;
  modulator type: intensity and phase modulators;
  filters at each amplifier output and modulator input, every $Z_R$: Fabry Perot filters.

FIG. 2 shows the Q factor of a wavelength division multiplexed transmission system on four channels at 20 Gbit/s. The lowest Q factor is then 7 on channel A for a propagation distance of 10 Mm.

FIG. 3 is a graph of Q factor as a function of distance in a transmission system in accordance with the invention, of the type described with reference to FIG. 1, with line filters every line $Z_A$ and modulation filters every $Z_R$ optimized independently of each other.

FIG. 3 shows that the lowest Q factor for a propagation distance of 10 Mm is 8. For the same propagation distance of 10 Mm, the invention can also significantly increase the Q factor on channels B, C and D, respectively from 8.5 to 11, from 11 to 14 and from 11 to 12.

FIG. 4 is a graph of Q factor as a function of the bandwidths of the two types of filter in a single-channel system. Although the invention is described in the previous examples in the case of a wavelength division multiplexed system, it applies with equal advantage in a single-channel transmission system. The major difference compared to the transmission system described with reference to FIG. 1 lies in the nature of the filters. Filters of any kind, not just Fabry Perot filters, can be used for a single-channel system. The system used to obtain the graph shown in the figure was a single-channel 20 Gbit/s system, with the following characteristics:

distance $Z_A$ between amplifiers: 45 km;
  distance $Z_R$ between amplifiers: 450 km;
  filters at amplifier outputs: second order Butterworth filters with a 3 dB bandwidth BW1;
  filters at modulator inputs: third order Butterworth filters with a 3 dB bandwidth BW2.

The FIG. 4 graph shows the ranges of the Q factor of the system for a propagation distance of 9 Mm; the graph is obtained by three random noise samplings which are then averaged. The straight line segment 12 on the graph broadly corresponds to prior art systems in which a single filter is used for the amplifiers and for the modulators; the graph shows clearly that there is an area of the (BW1, BW2) plane in which the Q factor is higher than on the straight line segment 12. In the FIG. 4 embodiment, a line filter with a bandwidth BW1 in the range from 1 nm to 1.6 nm would be chosen and the regeneration filter would be chosen with a bandwidth in the order of 0.4 nm, preferably in the range from 0.37 nm to 0.43 nm. More generally, the ratio BW1/BW2 between the bandwidths of the line filters and regeneration filters is preferably in the order of 3 (straight line segment 14). It is advantageously greater than 2 (straight line segment 13) but less than 4 (straight line segment 15).

For a wavelength division multiplexed system a choice of different line and regeneration filters similarly improves the Q factor; the bandwidths BW1 and BW2 are preferably chosen to satisfy the condition:

$$BW2<BW1<1.5\times BW2$$

In both cases, it is beneficial for the bandwidth BW2 of the regeneration filter to be less than the bandwidth of the line filter.

Obviously, the invention is not limited to the embodiments described by way of example. The wavelength allocation scheme is in no way limited to the examples described. Note also that, compared to the embodiments described, filters or amplifiers can be added or removed as required. Thus filters of the first type could be provided on the output side of alternate amplifiers, or one amplifier in three. It is also advantageous for the line filters, or filters of the first type, to be provided on the output side of the amplifiers. This is not essential, however. Similarly, the filters optimized for regeneration could be on the output side of the modulators, in particular in the case of phase modulation. The transmission system can also have a structure different from that described with reference to FIG. 1. A different arrangement of the amplifiers and the modulators along the line fiber could envisaged.

Finally, the invention has been described in the case of unidirectional transmission. It obviously applies to bi-directional transmission.

What is claimed is:

1. A fiber optic soliton signal transmission system comprising signal amplifier means and signal regenerator means, in-line first filter means and second filter means associated with the regenerator means, the second filter means having different filter characteristics from the first filter means and applying selective losses to the soliton signal thereby improving the regeneration.

2. A transmission system according to claim 1, wherein the first filter means have a grater bandwidth than the second filter means.

3. A transmission system according to claim 1, wherein the first filter means are on the output side of the amplifier means.

4. A transmission system according to claim 1, wherein the second filter means are on the input side of the regenerator means.

5. A transmission system according to claim 1, wherein the regenerator means comprise an intensity modulator.

6. A transmission system according to claim 1, wherein the system is a single-channel system, and wherein the second filter means have a bandwidth in the range from one-quarter to one-half that of the first filter means.

7. A transmission system according to claim 1, wherein the system is a wavelength division multiplexed system, and wherein the second filter means have a bandwidth more than two-thirds that of the first filter means.

8. A transmission system according to claim 1, wherein the system is a single channel system, and wherein the second filter means have a bandwidth one-third that of the first filter means.

9. A method of transmitting soliton signals including a step of amplifying the soliton signals, a step of of regenerating the soliton signals, an in-line filtering step effected by a first filter means filtering said soliton signals, and a regeneration filter step effected by second filter means filtering said soliton signals, wherein said second filter is different from the first filter means.

10. A method according to claim 9, wherein the first filter means having a greater bandwidth than the second filter means.

11. A method according to claim 9, wherein an in-line filtering step is effected immediately after an amplification step.

12. A method according to claim 9, wherein a regeneration filtering step is effected immediately before a regeneration step.

13. A method according to claim 9, wherein the regeneration step involves intensity modulation.

14. A method according to claim 9, wherein the transmission system is a single-channel transmission system, wherein the second filter means have a bandwidth in the range from one-quarter to one-half that of the first filter means.

15. A method according to claim 9, wherein the transmission system is a wavelength division multiplexed transmission system, and wherein the second filter means have a bandwidth greater than two-thirds that of the first filter means.

16. A method according to claim 9, wherein the transmission system is a single-channel transmission system, and wherein the second filter means have a bandwidth one-third that of the first filter means.

17. A fiber optic soliton signal transmission system comprising:

a signal amplifier;

a signal regenerator;

an in-line first filter; and a second regeneration filter, wherein the second filter applies selective losses to soliton signals for improved regeneration.

18. A transmission system according to claim 17, wherein the in-line first filter has a greater bandwidth than the second regeneration filter.

19. A transmission system according to claim 17, wherein the in-line first filter is optimized to eliminate asynchronous spontaneous emission noise outside the transmission channels.

* * * * *